P. E. LATTNER & S. N. ROBINSON.
BLOCKING DEVICE FOR TRUCKS.
APPLICATION FILED DEC. 3, 1908.
939,518.
Patented Nov. 9, 1909.
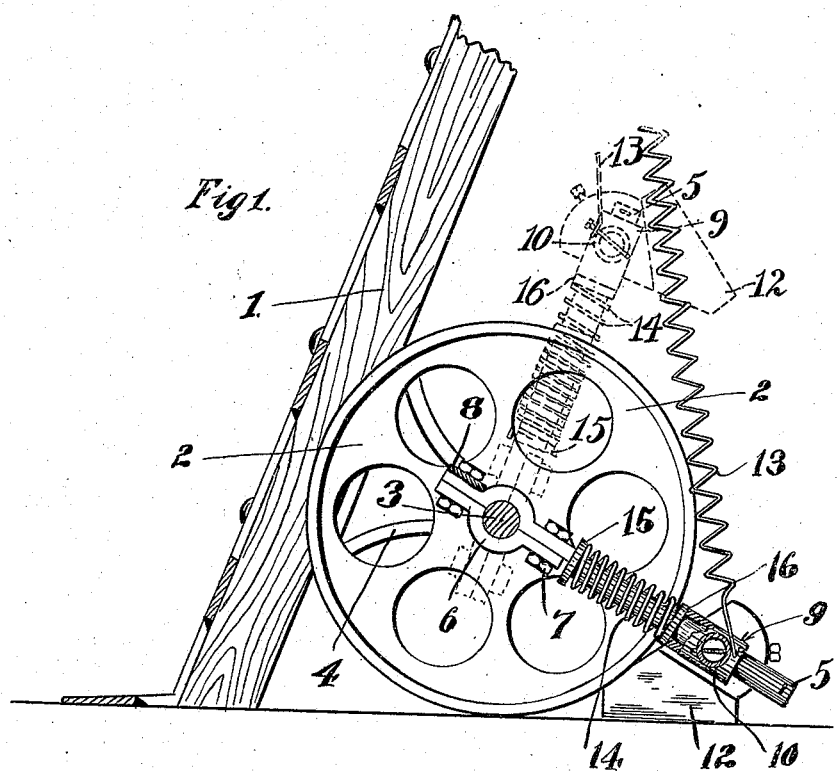
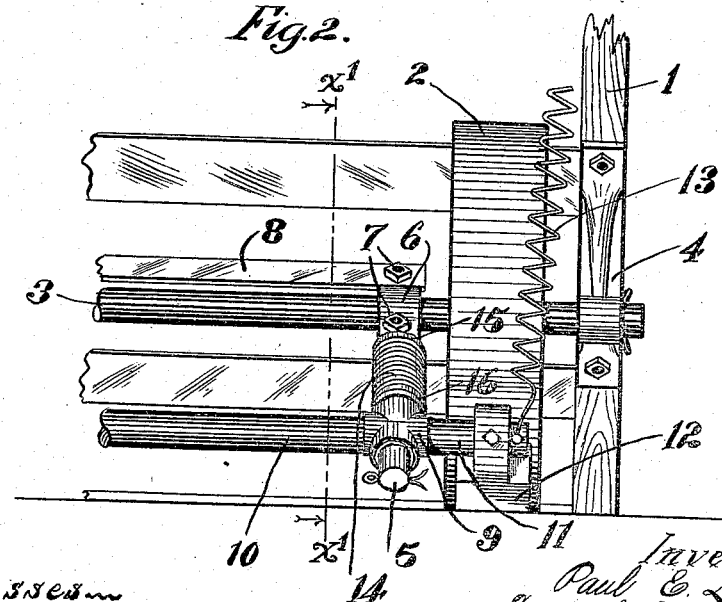
Witnesses
R. L. Hicks.
A. H. Opsahl
Inventors
Paul E. Lattner
Samuel N. Robinson
By their Attorneys
Williamson Merchant

UNITED STATES PATENT OFFICE.

PAUL E. LATTNER AND SAMUEL N. ROBINSON, OF MINNEAPOLIS, MINNESOTA.

BLOCKING DEVICE FOR TRUCKS.

939,518.  Specification of Letters Patent.  Patented Nov. 9, 1909.

Application filed December 3, 1908. Serial No. 465,830.

*To all whom it may concern:*

Be it known that we, PAUL E. LATTNER and SAMUEL N. ROBINSON, citizens of the United States, residing at Minneapolis, in the county of Hennepin and State of Minnesota, have invented certain new and useful Improvements in Blocking Devices for Trucks, &c.; and we do hereby declare the following to be a full, clear, and exact description of the invention, such as will enable others skilled in the art to which it appertains to make and use the same.

Our invention has for its object to provide an improved wheel blocking attachment for trucks, and to this end, it consists of the novel devices and combinations of devices hereinafter described and defined in the claims.

In the accompanying drawings, the invention is shown as applied to a two wheeled truck, such as used in stores, warehouses and the like, for moving the boxes, barrels, etc.

In the said drawings, like characters indicate like parts throughout the several views.

Referring to the drawings: Figure 1 is a section taken on the vertical line $x^1$ $x^1$ of Fig. 2, showing the invention applied as above stated; and Fig. 2 is a rear elevation of the parts shown in Fig. 1, some parts being broken away.

The numeral 1 indicates the body and the numeral 2 the wheels of the truck, which wheels are loosely journaled on an axle 3 loosely mounted at its ends in bearing brackets 4 rigidly secured to the side bars of the truck body 1. Loosely pivoted to the axle 3, just inward of the wheels, is a pair of radially extended parallel guide bolts or stems 5, shown as secured to the said axle by a clamp 6 and short nutted bolts 7. Also as shown, the inner ends of the guide bolts 5 are rigidly connected by a tie bar 8.

Cross couplings 9 are mounted to slide on the ends of the guide bolts 5 and are connected by a cross bar preferably in the form of a small pipe 10. Shorter pipe sections 11 are also connected to the cross couplings 9 and extend outward therefrom in axial alinement with the pipe 10. Wedge shaped blocking shoes 12 are rigidly secured to the ends of the projecting pipe sections 11 and one or more light coiled springs 13 connect the said pipe sections 11 to an upper portion of the truck frame 1, and exert force which tends to move the guide bolts 5 into upturned positions shown by dotted lines in Fig. 1. Coiled springs 14 which surround the guide bolts 5 are compressed between a fixed collar 15 and a sliding collar 16 provided on each bolt. The loose collars 16 are thus spring pressed against the cross couplings 9, and tend to force the shoes 12 outward away from the wheels as shown, by dotted lines in Fig. 1.

Normally, the blocking device will be held in its inoperative position shown by dotted lines in Fig. 1, in which position it will be entirely out of the way. When however, it is desired to block the truck so that it cannot run backward, the person handling the truck simply by stepping on the intermediate portion of the bar 10, forces the block shoes 12 downward into engagement with the floor or ground, and while the said shoes are in such position, the truck wheels are allowed to run backward onto the same, shown by the full lines in Fig. 1. To release the blocking device, it is only necessary to move the wheels forward out of engagement with the shoes 12, and as soon as this is done, the springs 13 and 14 will automatically restore the said blocking device to its inoperative position shown by dotted lines in Fig. 1.

A truck wheel blocking device of the kind described will be found extremely useful in connection with a great many different kinds of trucks. It is however, especially adapted for application to a two wheeled truck of the kind above described. In the use of these two wheeled trucks, it is customary to load the same while the truck bodies are turned nearly vertically upward, and it then becomes necessary to turn the truck frame downward over the wheels as a fulcrum, to bring the load into a balanced position, this action being frequently designated as "breaking the load". In doing this, the wheels must be held stationary, and this is generally found difficult, because of the force required to tilt the load over the wheels. With our improved blocking device, however, the wheels are effectually blocked and held while the load is being broken or turned into a balanced position.

The improved device therefore, enables a man to handle and to break a very much heavier load than would be possible where he must use one foot to block the wheels while breaking the load. Also it enables the work to be done much quicker and more easily.

The improved device, while simple and of small cost, has been found highly efficient for the purposes had in view.

What we claim is:

1. The combination with a wheeled truck, of a pair of guide rods pivotally mounted on the axle thereof, a tie bar rigidly secured to the inner ends of said guide rods and connecting the same for common oscillatory movements, a transverse rod or bar mounted on the free ends of said guide rods for lateral movements toward and from the axle, and a pair of wheel blocking shoes rigidly secured to and projecting from the end portions of said laterally movable rod or bar, and adapted to block the wheels of said truck, substantially as described.

2. The combination with a two-wheeled truck, of a pair of guide rods pivotally mounted on the axle of said truck, a tie bar rigidly connected to the inner ends of said guide rods and connecting the same for common oscillatory movements, a rod or bar mounted on the free ends of said guide rods for lateral movements toward and from the axle, wheel blocking shoes rigidly secured to and projecting from the end portions of said laterally movable rod or bar, springs on said guide rods tending to move the shoes outward, and a spring connected to said laterally movable rod or bar, and tending to move the shoes upward.

In testimony whereof we affix our signatures in presence of two witnesses.

PAUL E. LATTNER.
SAMUEL N. ROBINSON.

Witnesses:
HARRY D. KILGORE,
ALICE J. SWANSON.